United States Patent
Nagai et al.

[11] Patent Number: 6,000,292
[45] Date of Patent: Dec. 14, 1999

[54] ACTUATOR

[75] Inventors: Shigekazu Nagai, Tokyo; Toru Sugiyama, Abiko; Hiroyuki Shiomi, Ibaraki-ken, all of Japan

[73] Assignee: SMC Kabushiki Kaisha, Tokyo, Japan

[21] Appl. No.: 09/101,439

[22] PCT Filed: Dec. 26, 1996

[86] PCT No.: PCT/JP96/03831

§ 371 Date: Jul. 14, 1998

§ 102(e) Date: Jul. 14, 1998

[87] PCT Pub. No.: WO97/26461

PCT Pub. Date: Jul. 24, 1997

[30] Foreign Application Priority Data

Jan. 19, 1996 [JP] Japan ................................. 8-007813

[51] Int. Cl.$^6$ ............................................. H20K 7/00
[52] U.S. Cl. ...................... 74/89.15; 74/424.8 R; 277/634; 277/921
[58] Field of Search ........................ 74/89.15, 424.8 R, 74/459; 184/5, 100; 277/630, 634, 906, 921

[56] References Cited

U.S. PATENT DOCUMENTS

| | | | |
|---|---|---|---|
| 4,690,412 | 9/1987 | Tuckley et al. | 277/184 |
| 4,934,835 | 6/1990 | Albert | 384/43 |
| 4,976,067 | 12/1990 | Maas | 49/377 |
| 5,454,278 | 10/1995 | Kasuga | 74/459 |
| 5,761,960 | 6/1998 | Nagai et al. | 74/89.15 |
| 5,796,187 | 8/1998 | Nagai et al. | |

FOREIGN PATENT DOCUMENTS

| | | |
|---|---|---|
| 2-21024 | 1/1990 | Japan . |
| 2-145234 | 6/1990 | Japan . |
| 2-116056 | 9/1990 | Japan . |
| 2-127820 | 10/1990 | Japan . |
| 3-11158 | 2/1991 | Japan . |
| 4-25617 | 1/1992 | Japan . |
| 6-197491 | 7/1994 | Japan . |
| 6-222816 | 8/1994 | Japan . |
| 7-110057 | 4/1995 | Japan . |
| 7-217607 | 8/1995 | Japan . |

*Primary Examiner*—Tamara L. Graysay
*Assistant Examiner*—David Fenstermacher
*Attorney, Agent, or Firm*—Oblon, Spivak, McClelland, Maier & Neustadt, P.C.

[57] ABSTRACT

An actuator which makes it possible to avoid adhesion of dust or the like to a driving force-transmitting member, wipe out the fear of stop or breakage thereof, and avoid leakage of dust or the like to the outside. Fixing blocks 26a, 26b are slidably provided via guide blocks 22a to 22d on guide rails 18a, 18b for constructing an actuator 10. Slits 88a, 88b are defined at gaps between a top cover 84 and side covers 82a, 82b. Seal members 94a, 94b are provided for each of the slits 88a, 88b. A forward end of one of the seal members 94b is engaged with a step section 104a or 104b of the other seal member 94a to close the slit 88a, 88b. The fixing blocks 26a, 26b penetrate and protrude through the slits 88a, 88b. The forward ends of the seal members 94a, 94b abut against wall portions of the fixing blocks 26a, 26b to close the gaps disposed at the passages into the inside of the actuator 10.

10 Claims, 12 Drawing Sheets

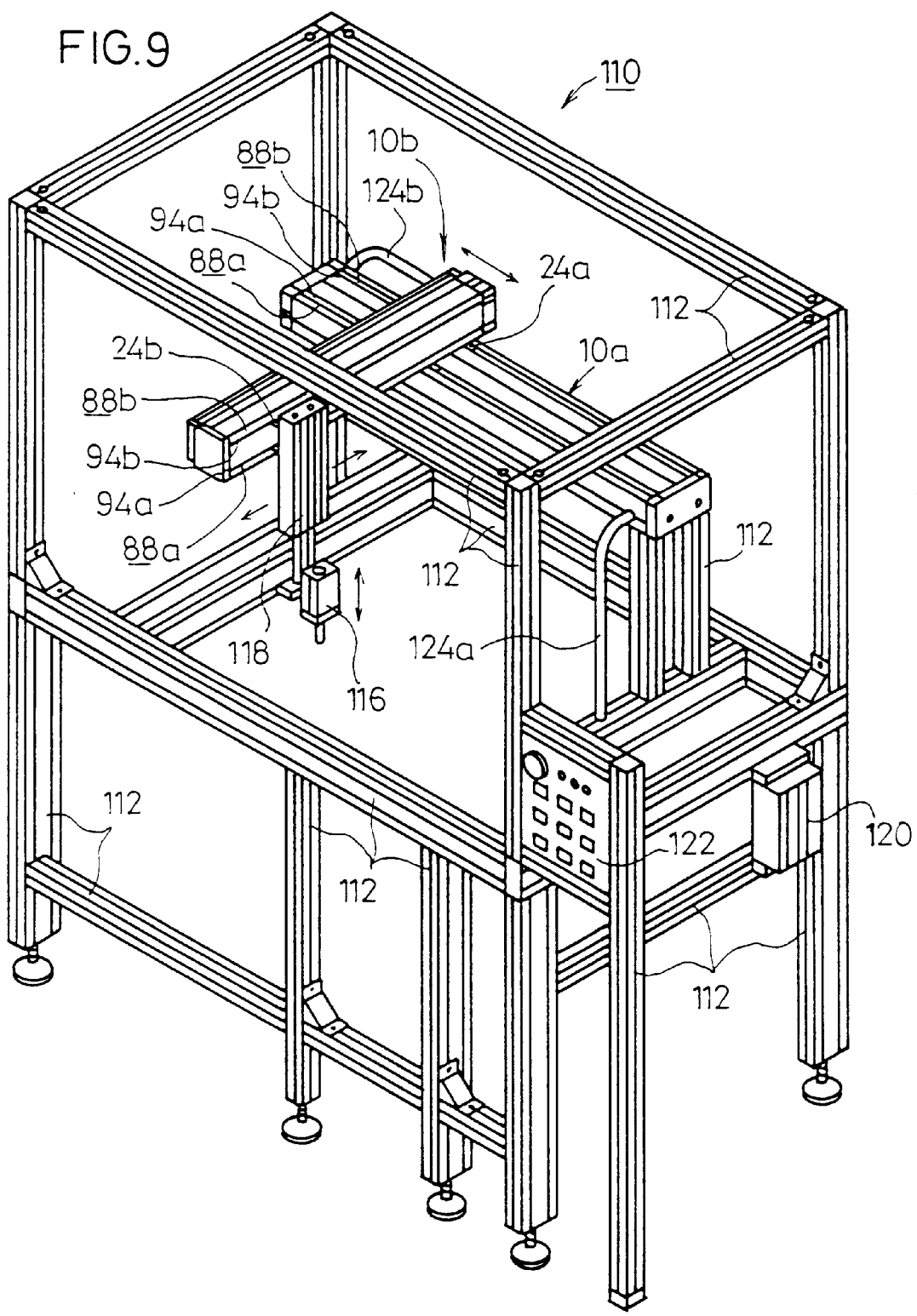

F I G. 11
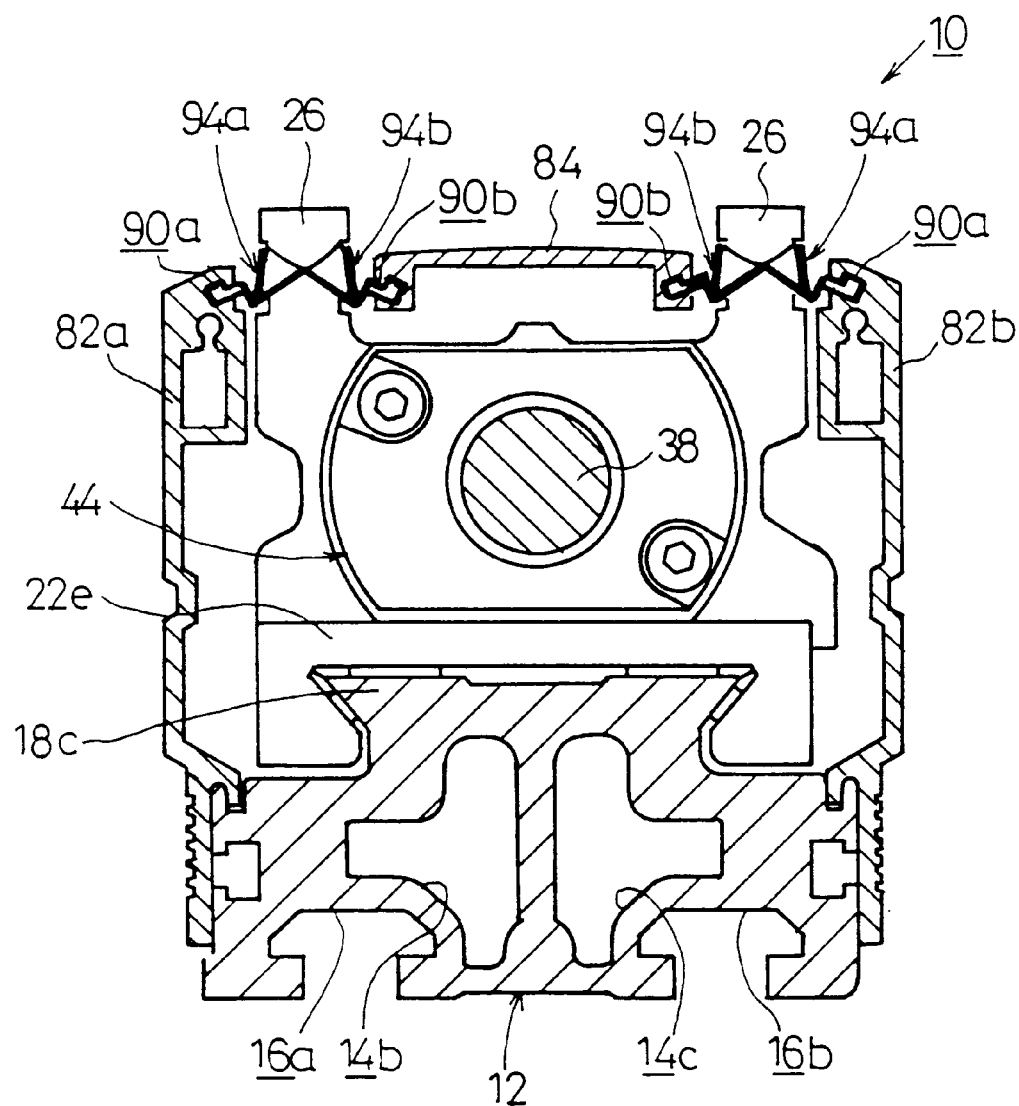

ACTUATOR

TECHNICAL FIELD

The present invention relates to an actuator for transporting a workpiece by transmitting a rotary driving force of a rotary driving source to a slider by the aid of a driving force-transmitting means provided on a main actuator body so that the slider is displaced.

BACKGROUND ART

An actuator has been hitherto used as a means for transporting a workpiece. The actuator basically comprises a rotary driving source arranged at the inside of a housing of the actuator, a driving force-transmitting means such as a ball screw for converting the rotary driving force of the rotary driving source into rectilinear motion to be transmitted to another member, and a slider for making displacement along the longitudinal direction of the actuator by the aid of the driving force-transmitting means.

The slider makes displacement along an opening of the housing, and it transmits the rotary motion of the rotary driving source disposed in the housing to the outside of the housing as the rectilinear motion.

However, the conventional actuator involves the following fear depending on the environment in which the actuator is used. That is, for example, dust, water, water vapor, coolant, cutting fluid, and grinding fluid make invasion through the opening of the housing, and they adhere to the driving force-transmitting means. When the actuator is driven, the dust or the like is caught in the gap between the driving force-transmitting means and the slider, resulting in stop or breakage of the actuator. Further, the following problem is pointed out. That is, when the actuator is used at a place to be prevented from dust or the like, such as those relevant to the medical field, those relevant to the field of food, and clean rooms, any leakage occurs from the actuator to the outside, concerning, for example, the dust and the grease used for the motor, the ball screw, the bearing and the like for constructing the driving force-transmitting means and the rotary driving source.

This invention has been made in order to solve the problems described above, an object of which is to provide an actuator which makes it possible to avoid adhesion of dust or the like to a driving force-transmitting means, wipe out the fear of stop or breakage or the like of the driving force-transmitting means, and avoid leakage of dust or the like to the outside.

DISCLOSURE OF THE INVENTION

In order to achieve the object described above, the present invention lies in an actuator for converting rotary motion of a rotary driving source into rectilinear motion by the aid of a driving force-transmitting means to move a workpiece by using a slider which makes displacement in accordance with an action of the rectilinear motion, the actuator comprising:

a housing for accommodating the rotary driving source and the driving force-transmitting means therein;

the slider which has a part protruding outwardly through an opening of the housing, for making the displacement by the aid of the driving force-transmitting means; and a seal member which is flexibly formed of an elastic material and which is provided to close the opening, wherein:

a part of the opening to be closed by the seal member is opened by the slider protruding through the opening.

According to the present invention, the opening is closed by the seal member. When the rotary driving source is operated, then the rotary motion of the rotary driving source is converted into the rectilinear motion by means of the driving force-transmitting means, and the slider is displaced. The seal member is pressed by the slider, and it is bent outwardly with respect to the opening. The seal member abuts against the wall of the slider to avoid invasion and leakage of dust or the like through the opening.

In a preferred embodiment, the seal member comprises a pair of elastic members, and step sections are formed at portions of the respective elastic members opposing to one another. When a forward end of one of the elastic members is engaged with the step section of the other when the opening is closed, the respective elastic members make abutment is a well-suited manner. Thus, it is possible to appropriately avoid invasion and leakage of dust or the like.

In another preferred embodiment, the elastic member is formed with a plurality of step sections. When the forward end of one of the elastic members is engaged with any one of the step sections of the other, the seal member can close the opening more reliably. Thus, it is possible to more appropriately avoid invasion and leakage of dust or the like.

In still another preferred embodiment, a wedge-shaped section is formed at an end of the slider in a displacement direction. When the seal member is flexibly bent by an end of the wedge-shaped section, no gap is formed between the seal member and the end of the slider in the longitudinal direction. Thus, it is possible to avoid invasion and leakage of dust or the like, which is preferable.

In still another preferred embodiment, the wedge-shaped section is formed of ultrahigh molecular weight polyethylene. In this embodiment, the friction is decreased between the wedge-shaped section and the seal member, which is more preferable.

In still another preferred embodiment, the slider comprises a pair of fixing blocks which are provided substantially in parallel to one another, and parts of the fixing blocks protrude outwardly through the pair of openings defined for the housing. In this embodiment, the slider can be stably supported by the pair of fixing blocks, which is preferable.

In still another preferred embodiment, the fixing block is formed of CFRP. In this embodiment, the fixing block can be formed to have a thin width. Therefore, it is possible to decrease the displacement amount of the seal member which is pressed and flexibly bent by the fixing block. Thus, it is possible to more appropriately avoid invasion and leakage of dust or the like.

In still another preferred embodiment, the rotary driving source is a motor. In this embodiment, it is possible to obtain an electric actuator capable of avoiding invasion and leakage of dust or the like.

In still another preferred embodiment, the driving force-transmitting means comprises:

a ball screw connected to the rotary driving source; and an engagement block secured to the slider and rotatably attached to the ball screw, wherein:

rotation of the ball screw allows the engagement block to make displacement integrally with the slider in an axial direction of the ball screw. In this embodiment, it is possible to obtain the actuator having a simple structure, which is more preferable.

In still another preferred embodiment, the housing comprises:

a frame;

end covers provided at both ends of the frame;

side covers provided at side surface sections of the frame; and a top cover provided at an upper surface section of the frame, wherein:

the opening is formed at a gap between the top cover and the side cover. In this embodiment, it is unnecessary to use any exclusive member for forming the opening. Thus, it is possible to reduce the production cost of the actuator, which is preferable.

BRIEF DESCRIPTION OF THE DRAWINGS

FIG. 9 shows a perspective view illustrating an actuator system to which the actuator according to the embodiment of the present invention is applied;

FIG. 10 shows actuators concerning other embodiments of the present invention;

FIG. 11 shows a longitudinal sectional view of an actuator concerning another embodiment of the present invention.

BEST MODE FOR CARRYING OUT THE INVENTION

The actuator according to the present invention as exemplified by preferred embodiments will be explained in detail below with reference to the accompanying drawings.

Figure 1:
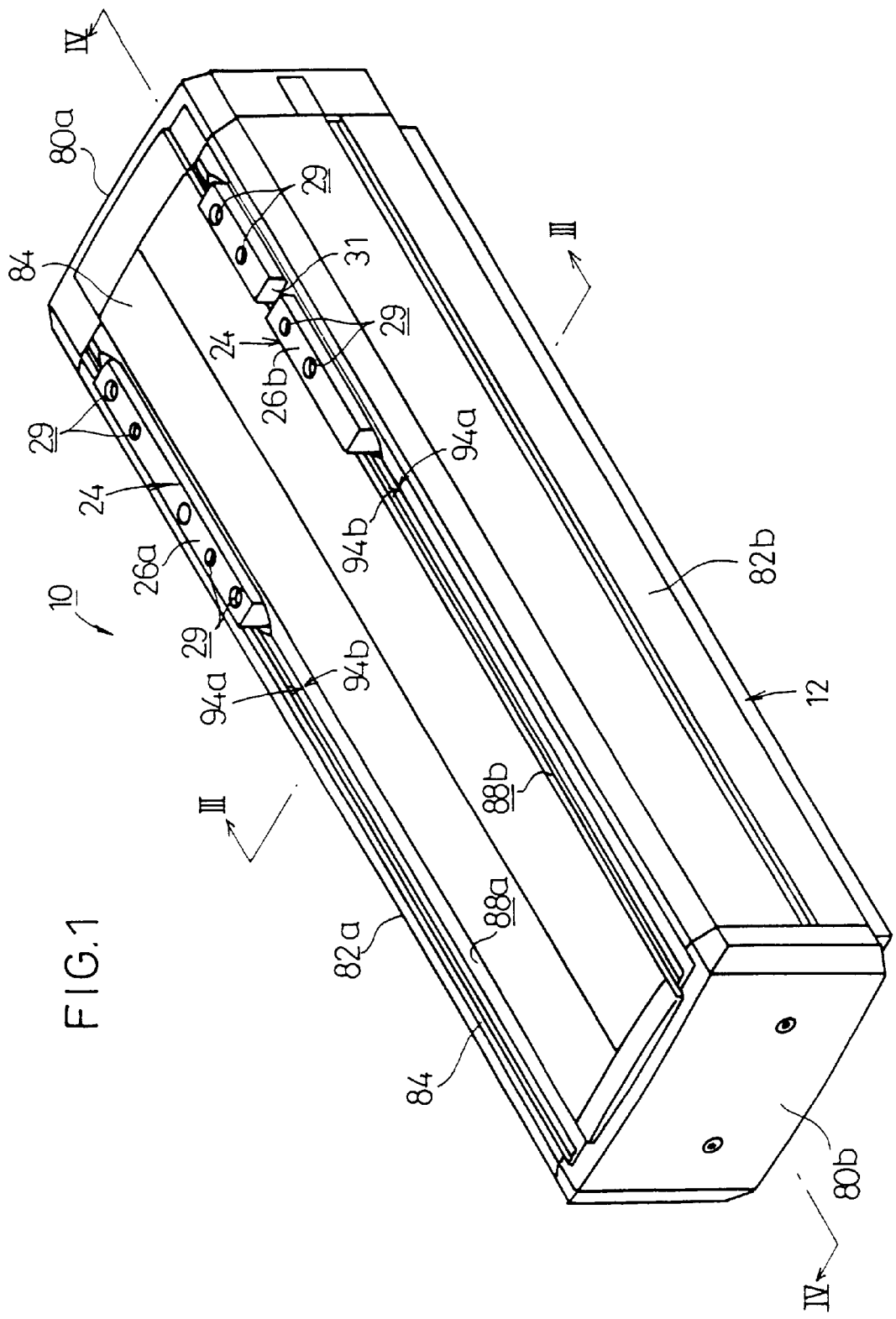
FIG. 1 shows a perspective view illustrating an actuator according to an embodiment of the present invention.
Figure 2:
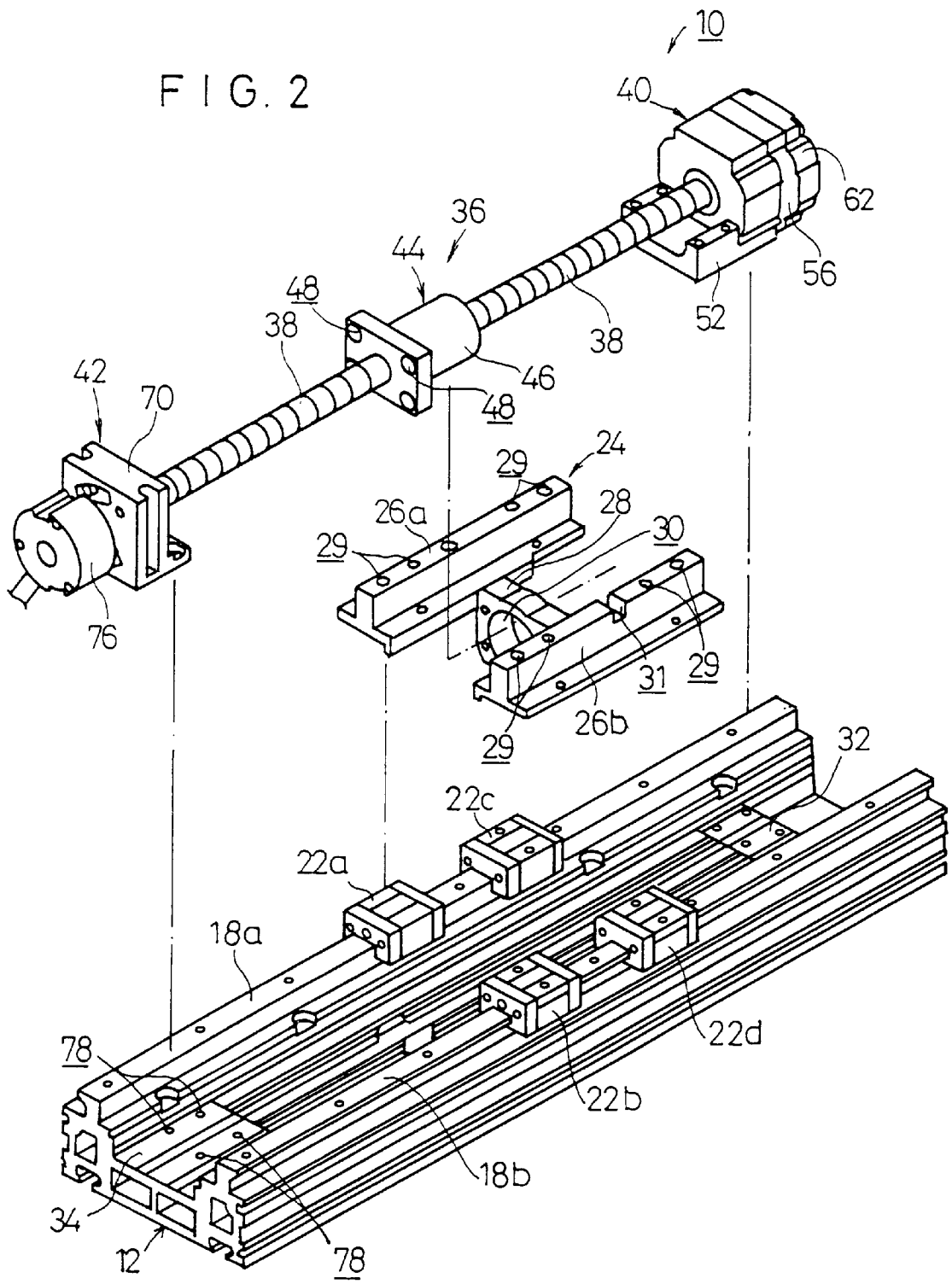
FIG. 2 shows an exploded perspective view illustrating principal parts of the actuator shown in FIG. 1.
Figure 3:
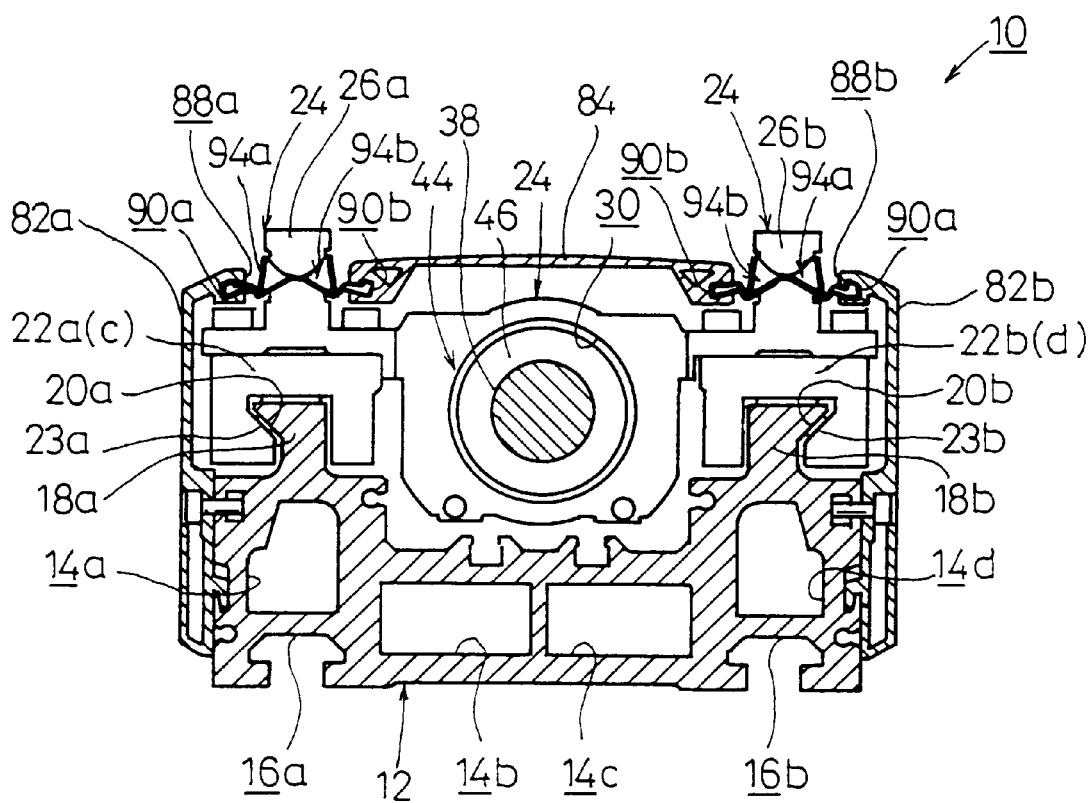
FIG. 3 shows a sectional view of the actuator taken along a line III—III shown in FIG. 1.

With reference to FIGS. 1 and 2, reference numeral 10 indicates an actuator according to an embodiment of the present invention. The actuator 10 comprises a lengthy frame 12 formed to have an approximately U-shaped cross section. As shown in FIG. 3, the frame 12 has, at its lower portion, through-holes 14a to 14d formed to have approximately rectangular cross sections. The through-holes 14a to 14d are used, for example, as passages for wiring led to a motor described later on. Grooves 16a, 16b, which extend along the longitudinal direction, and each of which has an approximately T-shaped cross section, are defined at the bottom surface of the frame 12 so that unillustrated fixing members are inserted thereinto in order to connect the actuator, for example, to another apparatus.

Guide rails 18a, 18b are formed at the upper portion of the frame 12 to extend substantially in parallel to one another. The guide rails 18a, 18b have slant surfaces 20a, 20b respectively. As shown in FIG. 3, the guide rails 18a, 18b are formed to have a wide width at their upper portions. Guide blocks 22a to 22d, which are slidable along the longitudinal direction of the guide rails 18a, 18b, are disposed on the respective guide rails 18a, 18b. Inclined sections 23a, 23b are formed for the guide blocks 22a to 22d. The inclined sections 23a, 23b are engaged with the slant surfaces 20a, 20b. Thus, the guide blocks 22a to 22d are prevented from disengagement. Unillustrated rolling members such ball bearings are arranged at sliding portions between the guide rails 18a, 18b and the guide blocks 22a to 22d. Accordingly, the guide blocks 22a to 22d can be smoothly displaced along the guide rails 18a, 18b.

A pair of fixing blocks 26a, 26b for constructing a slider 24 are fastened by screws and fixed on the guide blocks 22a to 22d such that they are separated from each other by a predetermined spacing distance and they are substantially parallel to one another (see FIGS. 2 and 3). A holding block 28 having an approximately rectangular configuration is integrally connected between the fixing blocks 26a, 26b. A circular hole 30 is defined through the holding block 28. For example, an unillustrated table member may be secured to the fixing blocks 26a, 26b by using screw holes 29 to be fastened with screws. Reference numeral 31 in the drawing indicates a groove to be used for positional determination when the unillustrated table member or the like is secured to the fixing blocks 26a, 26b.

Figure 4:
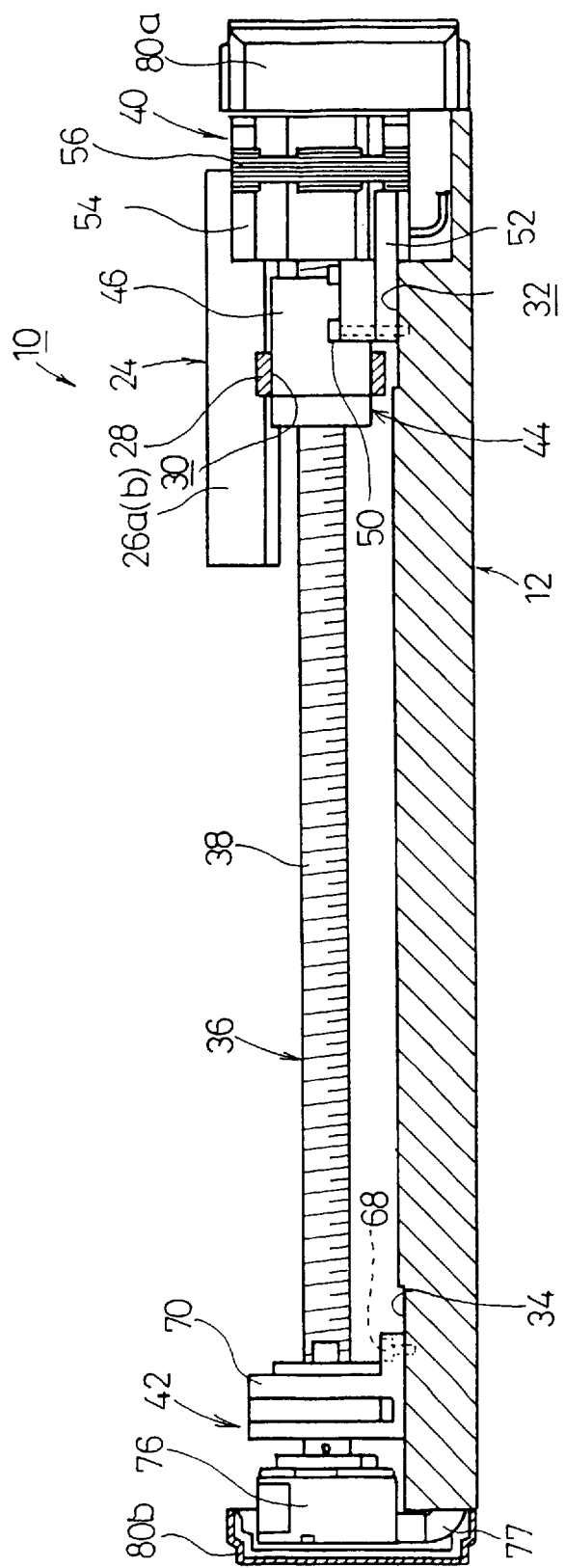
FIG. 4 shows a sectional view of the actuator taken along a line IV—IV shown in FIG. 1.

As shown in FIGS. 2 and 4, step sections 32, 34 are formed at both ends of the frame 12. A driving unit 36 is fixed on the step sections 32, 34. The driving unit 36 comprises a ball screw 38, a motor section 40 and an encoder section 42 which are provided coaxially at both ends of the ball screw 38 respectively, and an engagement block 44 which is rotatably attached to the ball screw 38 to make displacement along the axial direction, wherein the ball screw 38, the motor section 40, the encoder section 42, and the engagement block 44 are integrated into one unit. The engagement block 44 is provided with a column section 46. The column section 46 is installed into the hole 30 of the holding block 28 by the aid of attachment holes 48. Alternatively, an unillustrated timing belt may be used in place of the ball screw 38 which functions as a feed screw.

Figure 5:
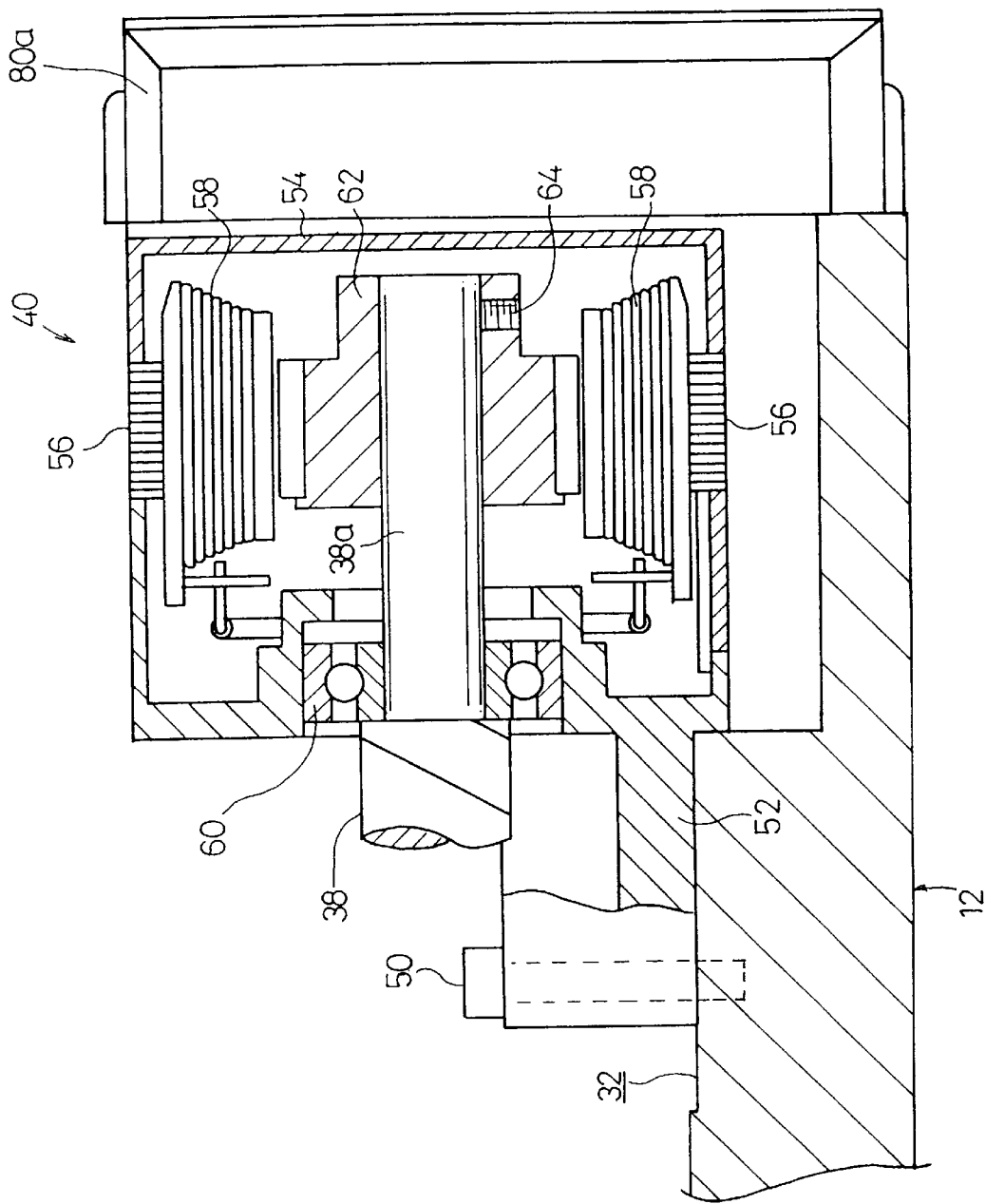
FIG. 5 shows a partial sectional view illustrating a motor section for constructing a driving unit of the actuator shown in FIG. 1.

As shown in FIG. 5, the motor section 40 is fixed on the step section 32 of the frame 12 by the aid of screws 50. The motor section 40 includes a motor-fixing block 52 which is positioned at the center of the frame 12 by inserting an unillustrated positioning pin, and a casing 54 having an approximately rectangular cross section to be integrally joined to the motor-fixing block 52. A stator 56 is provided at the outer circumference portion of the casing 54. A stator coil section 58 is provided with a coil wound around at the inner wall surface of the stator 56. A shaft section 38a, which continues to the terminal end of the ball screw 38 and which extends along the axial direction, is rotatably supported by a bearing member 60 in the casing 54. A rotor 62 is held by the shaft section 38a by the aid of a set screw 64.

Figure 6:
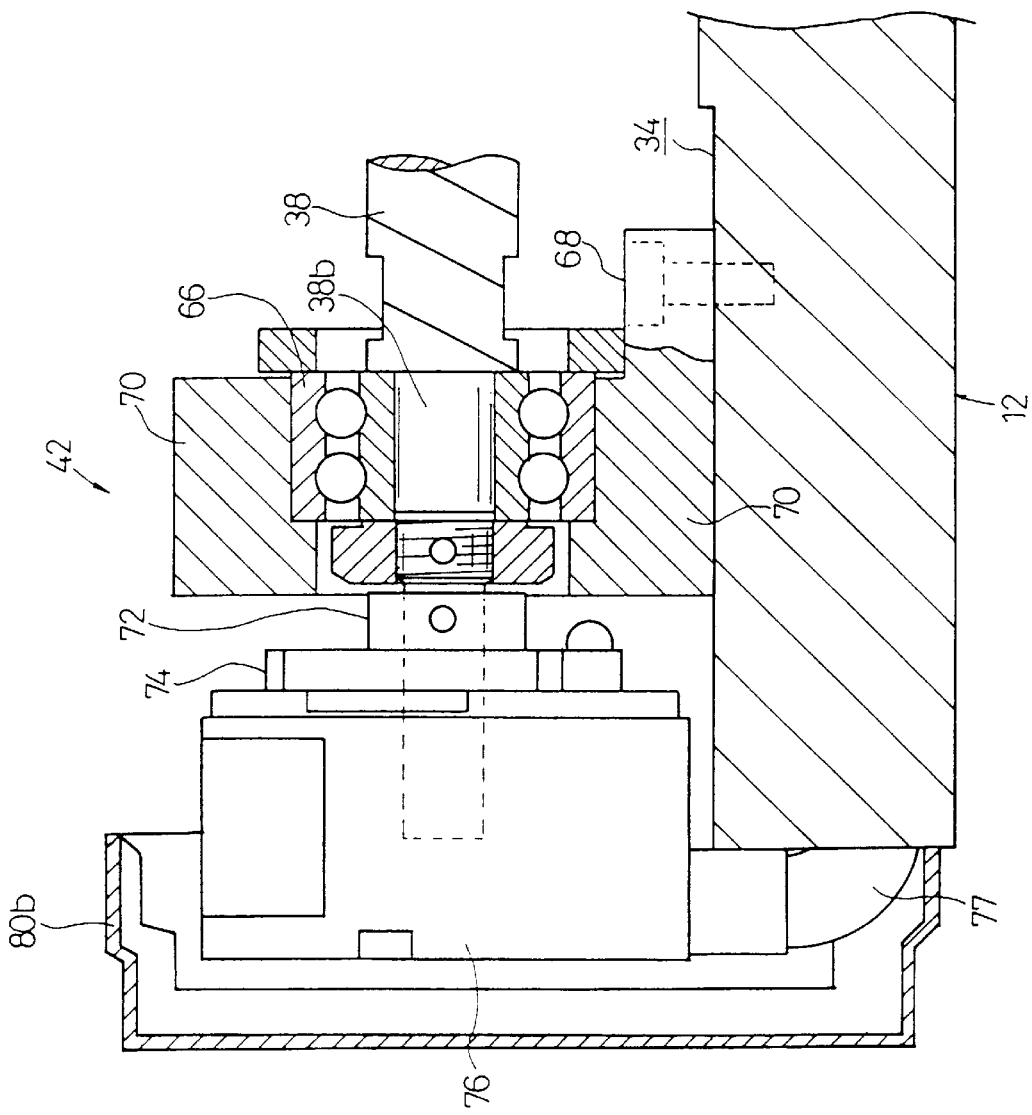
FIG. 6 shows a partial sectional view illustrating an encoder section for constructing the driving unit of the actuator shown in FIG. 1.

As shown in FIG. 6, the encoder section 42 comprises an encoder-fixing block 70 for rotatably supporting a shaft section 38b continued to the ball screw 38 by the aid of a bearing member 66, the encoder-fixing block 70 being fixed to the step section 34 of the frame 12 by the aid of screws 68, and a main encoder body 76 for detecting, for example, the number of rotation or the angle of rotation of the ball screw 38, the main encoder body 76 being connected to the encoder-fixing block 70 by the aid of connecting members 72, 74. Detection signals concerning, for example, the number of rotation or the angle of rotation, which are generated by the main encoder body 76, are introduced into an unillustrated controller via a lead wire 77.

As shown in FIG. 2, the driving unit 36 is fixed by positioning and fixing the motor section 40 and the encoder section 42 on the step sections 32, 34 defined at the both ends of the frame 12 respectively. Thus, the parallel accuracy can be secured for the ball screw 38 and the guide rails 18a, 18b. Further, unillustrated positioning pins are inserted into positioning holes (not shown) defined in the motor-fixing block 52 and the encoder-fixing block 70 respectively, and into positioning holes 78 defined in the step sections 32, 34 of the frame 12 respectively. Thus, the motor-fixing block 52 and the encoder-fixing block 70 can be positioned at the center of the frame 12 respectively.

The driving unit 36 comprises the motor section 40, the ball screw 38, and the encoder section 42 as one unit. However, for example, only the motor section 40 and the ball screw 38 may be constructed as a unit by using an unillustrated pulse motor such as a stepping motor.

It is also possible to adopt an arrangement in which the encoder-fixing block 70 is provided with a sensor such as a limit switch in place of the main encoder body 76.

As shown in FIG. 4, a pair of end covers 80a, 80b, which are opposed to one another, are installed at both ends of the frame 12 along the longitudinal direction respectively. As shown in FIG. 3, a pair of side covers 82a, 82b, which are opposed to one another, are installed at both side surfaces of the frame 12 along the transverse direction respectively. A top cover 84 is installed at the upper surface of the frame 12. The housing of the actuator 10 is constructed by the frame 12, the end covers 80a, 80b, the side covers 82a, 83b, and the top cover 84.

Figure 7:
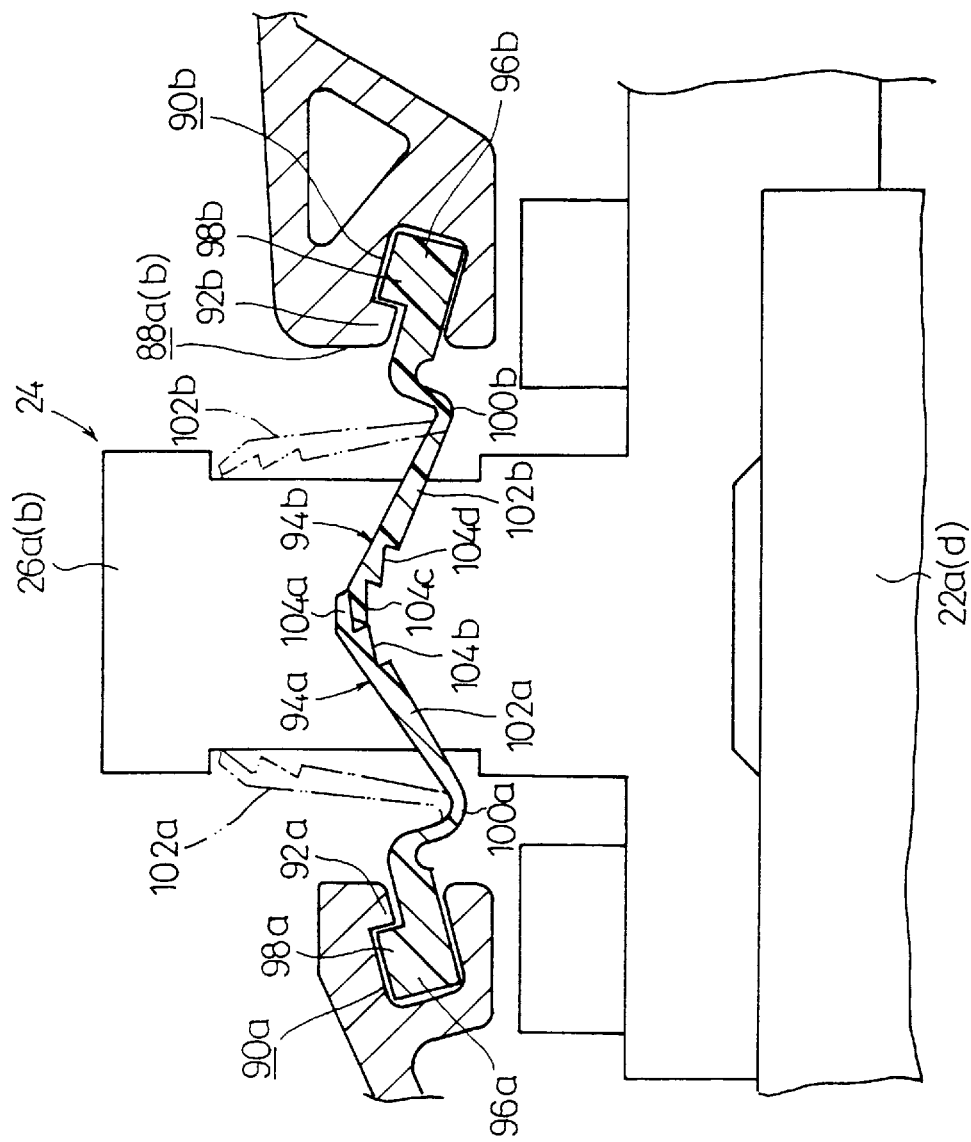
FIG. 7 shows a partial magnified sectional view illustrating the actuator shown in FIG. 3.

Slits (openings) 88a, 88b are defined at gaps between the top cover 84 and the side covers 82a, 82b, which extend along the longitudinal direction of the frame 12. As shown in FIG. 7, grooves 90a, 90b are defined at wall portions facing to each of the slits 88a, 88b between the top cover 84 and each of the side covers 82a, 82b. Projections 92a, 92b are formed in the vicinity of the opening, adjacent to the grooves 90a, 90b. Edges of a pair of seal members 94a, 94b are inserted into the grooves 90a, 90b, each of the seal members 94a, 94b being formed to have a lengthy plate-shaped configuration.

The pair of seal members 94a, 94b are separated from each other along the displacement direction of the slider 24. Each of the seal members 94a, 94b is formed of a material having elasticity such as natural rubber and synthetic rubber. An engaging section 96a, 96b, which is formed to be thick, is provided at the edge of the seal member 94a, 94b. A projection 98a, 98b, which is formed at the engaging section 96a, 96b along the edge, is engaged with the projection 92a, 92b of the groove 90a, 90b. Thus, the seal member 94a, 94b is prevented from disengagement from the groove 90a, 90b. A flexible bending section 100a, 100b, which is formed to be thin, is continued to the engaging section 96a, 96b.

A closing section 102a, 102b is further formed continuously to the flexible bending section 100a, 100b. The closing section 102a, 102b is formed such that its thickness is gradually increased as the spacing distance from the flexible bending section 100a, 100b is increased. Step sections 104a, 104b are formed on the lower surface of the closing section 102a as shown in the drawing. On the other hand, step sections 104c, 104d are formed on the lower surface of the closing section 102b. The forward end of the first closing section 102b is engaged with the step section 104a or the step section 104b of the second closing section 102a, and they make tight contact with each other owing to the elasticity of the material for forming the seal members 94a, 94b. The seal members 94a, 94b are arranged in a roof-shaped configuration to close the slit 88a, 88b. Although not shown, even when the forward end of the second closing section 102a is engaged with the step section 104c or the step section 104d of the first closing section 102b, it is also possible to close the slit 88a, 88b.

The fixing blocks 26a, 26b for constructing the slider 24 penetrate through the slits 88a, 88b, and they protrude upwardly as shown in the drawing. Thus, the rectilinear motion effected in the housing in the actuator 10 is transmitted to the outside of the actuator 10. The respective closing sections 102a, 102b of the seal members 94a, 94b are pressed by the fixing block 26a, 26b, and they are displaced outwardly from the slit 88a, 88b as shown by two-dot chain lines in FIG. 7. During this process, the forward ends of the closing sections 102a, 102b abut against the wall portions of the fixing block 26a, 26b by the aid of the elasticity of the material for constructing the seal members 94a, 94b. Thus, the closed state is maintained at the gap disposed at the passage into the inside of the actuator 10.

The actuator 10 according to the embodiment of the present invention is basically constructed as described above. Next, its operation, function, and effect will be explained.

The motor section 40 is driven by operating the unillustrated power source to rotate the ball screw 38 which functions as the motor shaft. In this embodiment, for example, the number of rotation or the angle of rotation of the motor is detected by the main encoder body 76 provided at the end of the ball screw 38. The detected signal is introduced into the unillustrated controller via the lead wire 77 inserted into any one of the through-holes 14a to 14d.

The rotational motion of the ball screw 38 is transmitted to the engagement block 44 rotatably attached to the ball screw 38, and it is converted into the rectilinear motion. Thus, the slider 24, which holds the engagement block 44, is displaced smoothly and linearly along the guide rails 18a, 18b.

Figure 8:
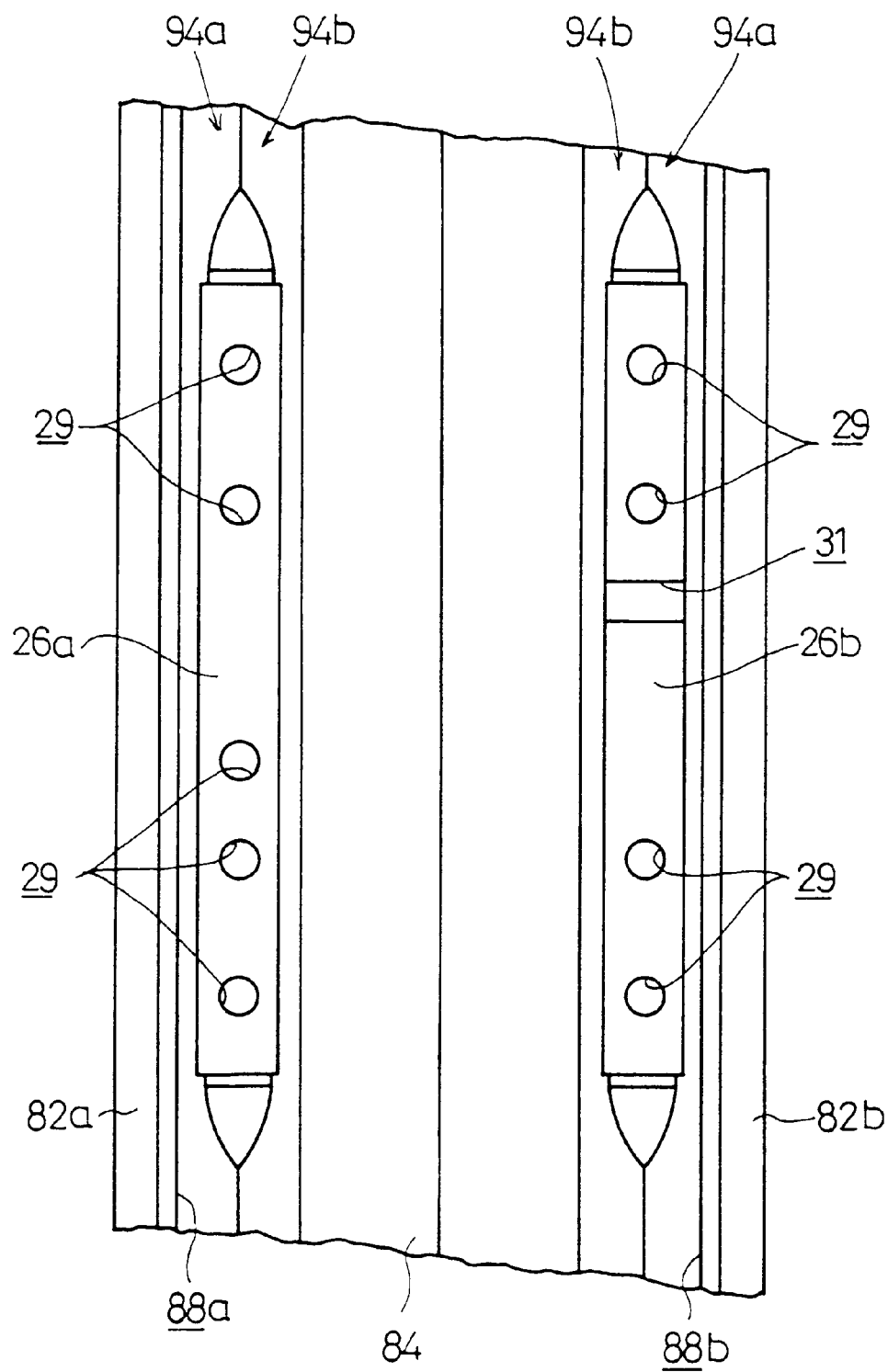
FIG. 8 shows a partial magnified plan view illustrating the actuator shown in FIG. 1.

During this process, the seal members 94a, 94b are gradually displaced outwardly with respect to the slit 88a, 88b, and they are separated from each other on the front side in the travelling direction of the slider 24 by being pressed by the fixing block 26a, 26b, from the state in which the seal members 94a, 94b make tight contact in the roof-shaped configuration to close the slit 88a, 88b as shown by solid lines in FIG. 7. As a result, the forward ends of the closing sections 102a, 102b are opened along the wall portions of the fixing block 26a, 26b as shown by two-dot chain lines in FIG. 7. On the other hand, the seal members 94a, 94b are gradually displaced on the opposite side in the travelling direction of the slider 24 owing to the elasticity of the seal members 94a, 94b, from the state in which the seal members 94a, 94b slidably contact with the wall portions of the fixing block 26a, 26b. The forward end of the first seal member 94 is engaged with the step section 104a of the second seal member 94a to make tight contact in the roof-shaped configuration. In this embodiment, as shown in FIG. 8, the closed state is maintained for the slits 88a, 88b, regardless of the presence or absence of the fixing blocks 26a, 26b. Thus, the actuator 10 is prevented from invasion of dust or the like into the inside of the actuator 10 and from leakage of dust, grease, or the like from the actuator 10 to the outside.

It is also assumed that the forward end of the first closing section 102b fails to make engagement with the step section 104a disposed at the forward end side of the second closing section 102a. In such a case, the engagement with the other step section 104b makes it possible to close the slits 88a, 88b. Accordingly, the integral formation of the plurality of step sections 104a, 104b on the seal members 94a, 94b makes it possible to more reliably close the slits 88a, 88b and avoid invasion and leakage of dust or the like. It is a matter of course that the forward end of the seal member 94a may be engaged with the step section 104c or the step section 104d of the seal member 94b.

The internal space of the actuator 10 may be allowed to communicate with a vacuum suction source, for example, via the through-holes 14a to 14d defined in the frame 12 to draw the interior air from the actuator 10 together with dust or the like. By doing so, the actuator 10 can be more appropriately prevented from leakage of dust or the like therefrom to the outside.

FIG. 9 shows an actuator system 110 to which the actuator 10 according to the embodiment of the present invention is applied. The actuator system 110 includes frames constructed by a plurality of columnar members 112 for forming the system 110. A first actuator 10a is secured to one of the columnar members 112. A second actuator 10b is attached to a slider 24a of the first actuator 10a so that it extends in a direction perpendicular to the displacement direction of the slider 24a. A cylinder 118, to which an attracting unit 116 is installed, is attached to a slider 24b of the second actuator 10b. The first actuator 10a, the second actuator 10b, the cylinder 118, and the attracting unit 116 are electrically connected to a controller 120 via cables 124a, 124b. The controller 120 is electrically connected to a control panel 122.

When an operator operates the control panel 122 of the actuator system 110 constructed as described above, the first actuator 10a, the second actuator 10b, the cylinder 118, and the attracting unit 116 are operated in a predetermined manner on the basis of the control command given by the controller 120. For example, an unillustrated workpiece, which is transported between the frames, is subjected to working operation such as attraction and transfer.

It is noted that the slits 88a, 88b of the first actuator 10a and the second actuator 10b are closed by the seal members 94a, 94b. Therefore, the first actuator 10a and the second actuator 10b are free from the fear of invasion of dust or the like thereinto to stop or break the actuator system 110. Further, the first actuator 10a and the second actuator 10b are free from the fear of leakage of dust or the like therefrom to contaminate the interior of the room in which the actuator system 110 is arranged. Therefore, the actuator system 110 can be used at a place to be prevented from dust or the like, such as those relevant to the medical field, those relevant to the field of food, and clean rooms.

Figure 10A:
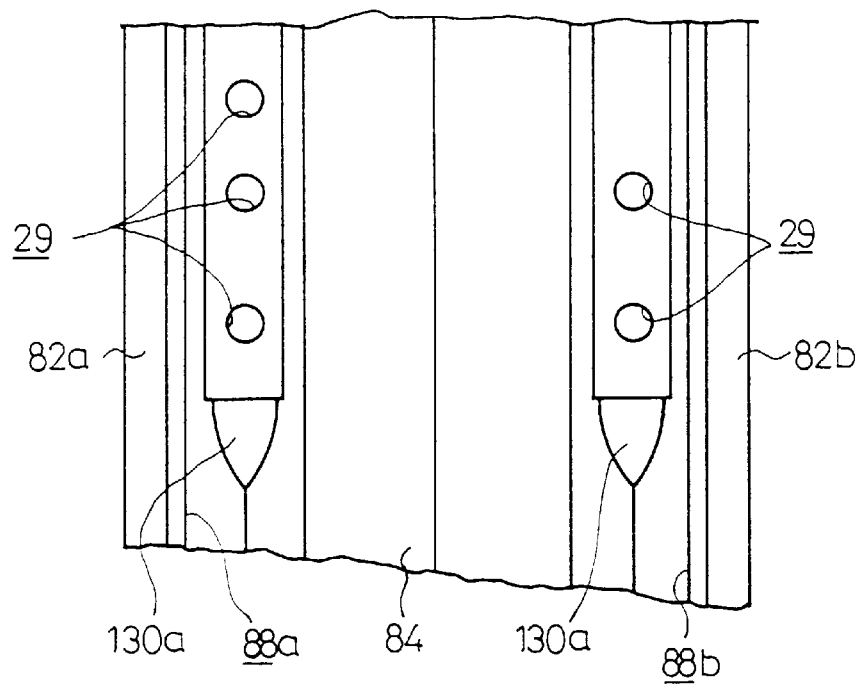
FIG. 10A shows a partial magnified plan view illustrating the actuator with a circumferential surface of a wedge-shaped section of a slider formed to have a convex configuration.
Figure 10B:
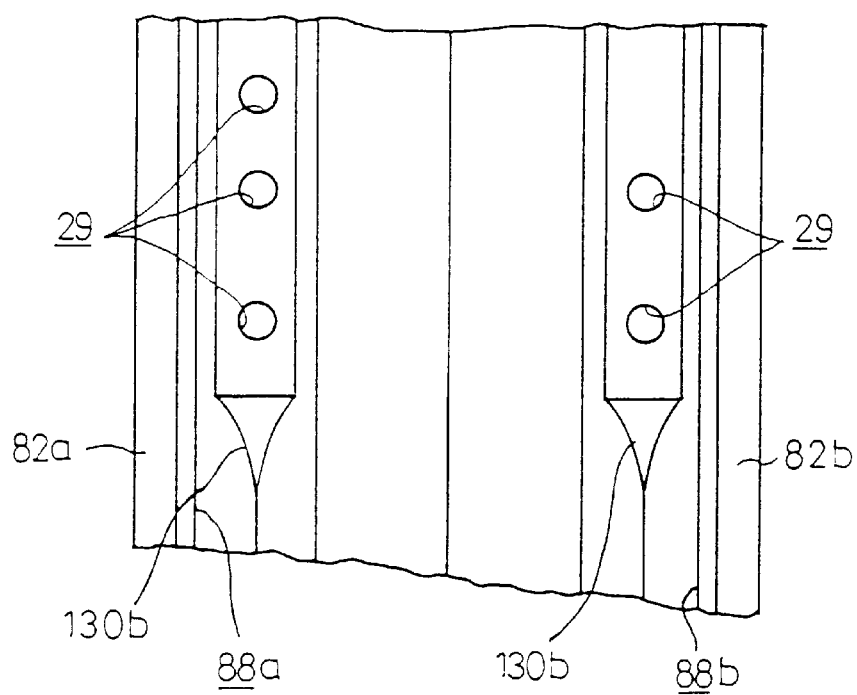
FIG. 10B shows a partial magnified plan view illustrating the actuator with a circumferential surface of a wedge-shaped section of a slider formed to have a concave configuration.

In the foregoing embodiments, the fixing blocks 26a 26b are formed to have the rectangular cross-sectional configuration. However, as shown in FIGS. 10A and 10B, the end in the displacement direction of the fixing block 26a, 26b may be made gradually thin to form a wedge-shaped section 130a or a wedge-shaped section 130b. In this embodiment, when the seal members 94a, 94b make displacement at front and rear portions in the travelling direction of the slider 24 in accordance with the displacement of the slider 24, the forward ends of the closing sections 102a, 102b are disposed along wedge-shaped wall portions of the fixing block 26a, 26b. Accordingly, the gap, which is disposed at the passage into the inside of the actuator 10, is further decreased. Thus, it is possible to more appropriately avoid invasion and leakage of dust or the like. In this embodiment, the circumferential configuration of the wedge-shaped section 130a may be convex as shown in FIG. 10A. Alternatively, the circumferential configuration of the wedge-shaped section 130b may be concave as shown in FIG. 10B. When the wedge-shaped sections 130a, 130b are formed of a synthetic resin such as ultrahigh molecular weight polyethylene (UHMWPE), the friction is preferably decreased with respect to the seal members 94a, 94b.

When grease or the like is applied to the seal members 94a, 94b, then the respective seal members 94a, 94b make tight contact more appropriately, and it is possible to obtain further smooth operation of the slider 24.

When a material such as CFRP is used for the fixing blocks 26a, 26b, then the width of the fixing blocks 26a, 26b can be formed to be thin, and the displacement amount of the seal members 94a, 94b can be decreased. Thus, it is possible to more appropriately avoid invasion and leakage of dust or the like.

In the foregoing embodiments, the two slits 88a, 88b are used. However, it is allowable to use one slit or three or more slits. In such an embodiment, a pair of seal members 94a, 94b are provided for each slit.

Figure 12:
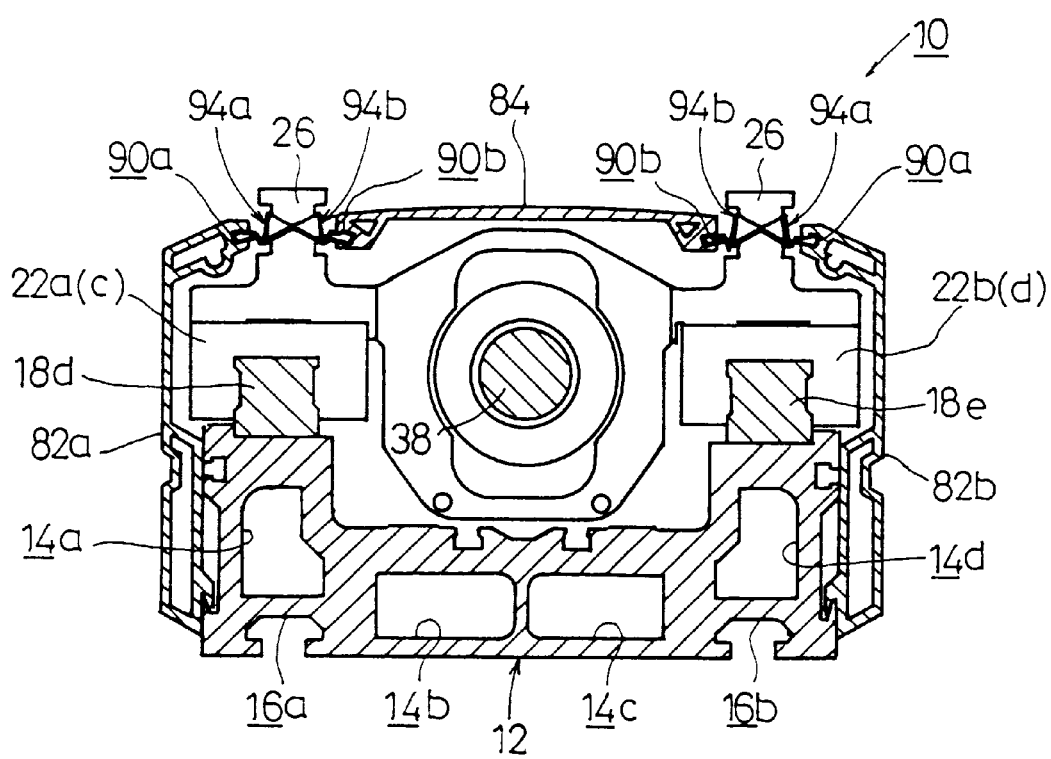
FIG. 12 shows a longitudinal sectional view of an actuator concerning still another embodiment of the present invention.

Alternatively, as shown in FIG. 11, one guide rail 18c having a wide width may be formed at an upper portion of a frame 12 so that one guide block 22e having a wide width may slide thereon. Further alternatively, as shown in FIG. 12, a frame 12 and guide rails 18d, 18e are formed by using different members so that they are secured to one another by using unillustrated screws or the like.

The present invention is also applicable to electromagnetic linear actuators, pneumatic linear actuators, pneumatic cylinders, and actuators described in Japanese Laid-Open Patent Publication Nos. 6-197491, 7-110057, and 6-222816 filed by the present applicant, as well as structures or systems constructed by using such actuators.

According to the actuator concerning the embodiment of the present invention, the opening of the actuator is closed by the seal members. Accordingly, the driving force-transmitting means is prevented from adhesion of dust or the like. Therefore, it is possible to avoid the fear of stop or breakage of the actuator, which would be otherwise caused by dust or the like caught into the actuator. It is possible to effect the stable transport function for the workpiece, making it easy to maintain and manage the actuator. Further, the seal members make it possible to exclude leakage of dust, grease or the like from the inside of the actuator. Accordingly, the actuator can be used, for example, for those relevant to the medicine, those relevant to the food, and clean rooms.

The plurality of step sections are formed at the mutually opposing portions of the pair of seal members. Accordingly, the opening is reliably closed by engaging the forward end of the first seal member with the step section of the second seal member. Thus, it is possible to more appropriately avoid invasion and leakage of dust or the like.

When the wedge-shaped section is formed at the end of the slider to avoid the formation of the gap between the seal members and the end in the longitudinal direction of the slider, the opening can be closed more reliably. When the wedge-shaped section is formed of ultrahigh molecular weight polyethylene, it is possible to decrease the friction between the wedge-shaped section and the seal members, which is preferable.

The slider can be stably supported by the pair of fixing blocks provided substantially in parallel to one another for the slider. When the fixing blocks are formed of CFRP, then the width of the fixing blocks can be formed to be thin, and it is possible to decrease the displacement amount of the seal members pressed and flexibly bent by the fixing blocks. Thus, it is possible to more appropriately avoid invasion and leakage of dust or the like.

When the motor is used for the rotary driving source, it is possible to obtain the electric actuator capable of avoiding invasion and leakage of dust or the like. In this embodiment, when the driving force-transmitting means is based on the use of the ball screw and the engagement block provided for the slider and rotatably attached to the ball screw, the actuator can be conveniently constructed.

When the housing is constructed by the frame, the end covers, the side covers, and the top cover, and the opening is formed at the gap between the top cover and the side cover, then it is unnecessary to use any exclusive member for forming the opening.

INDUSTRIAL APPLICABILITY

As described above, the actuator according to the present invention is appropriately usable to transport the workpiece or the like, for example, on the production line arranged in factories which frequently involve dust, water, water vapor, coolant, cutting fluid, grinding fluid and the like, and in factories to be prevented from dust or the like, such as those relevant to the medical field, those relevant to the field of food, and clean rooms.

We claim:

1. An actuator for converting rotary motion of a rotary driving source (40) into rectilinear motion by the aid of a driving force-transmitting means (38, 44) to move a workpiece by using a slider (24) which makes displacement in accordance with an action of said rectilinear motion, said actuator comprising:

a housing (12, 80a, 80b, 82a, 82b, 84) for accommodating said rotary driving source (40) and said driving force-transmitting means (38, 44) therein;

said slider (24) which has a part protruding outwardly through an opening (88a, 88b) of said housing (12, 80a, 80b, 82a, 82b, 84), for making said displacement by the aid of said driving force-transmitting means; and a seal member (94a, 94b) which is flexibly formed of an elastic material and which is provided to close said opening (88a, 88b), wherein:

a part of said opening (88a, 88b) to be closed by said seal member (94a, 94b) is opened by said slider (24) protruding through said opening (88a, 88b).

2. The actuator according to claim 1, wherein said seal member (94a, 94b) comprises a pair of elastic members having step sections (104a, 104b, 104c, 104d) formed at opposing portions respectively, and a forward end of one of said elastic member s is engaged with any of said step sections (104a, 104b, 104c, 104d) of the other when said opening (88a, 88b) is closed.

3. The actuator according to claim 2, wherein said elastic member is formed with a plurality of step sections (104a, 104b, 104c, 104d), and said forward end of one of said elastic members is engaged with any one of said step sections (104a, 104b, 104c, 104d) of the other.

4. The actuator according to claim 1, wherein a wedge-shaped section (130a, 130b) is formed at an end of said slider (24) in a displacement direction, and said seal member (94a, 94b) is flexibly bent by an end of said wedge-shaped section (130a, 130b).

5. The actuator according to claim 4, wherein said wedge-shaped section (130a, 130b) is formed of ultrahigh molecular weight polyethylene.

6. The actuator according to claim 1, wherein said slider (24) comprises a pair of fixing blocks (26a, 26b) which are provided substantially in parallel to one another, and parts of said fixing blocks (26a, 26b) protrude outwardly through said pair of openings (88a, 88b) defined for said housing (12, 80a, 80b, 82a, 82b, 84).

7. The actuator according to claim 6, wherein said fixing block (26a, 26b) is formed of CFRP.

8. The actuator according to claim 1, wherein said rotary driving source is a motor (40).

9. The actuator according to claim 1, wherein said driving force-transmitting means comprises:

a ball screw (38) connected to said rotary driving source (40); and an engagement block (44) secured to said slider (24) and rotatably attached to said ball screw (38), wherein:

rotation of said ball screw (38) allows said engagement block (44) to make displacement integrally with said slider (24) in an axial direction of said ball screw (38).

10. The actuator according to claim 1, wherein said housing (12, 80a, 80b, 82a, 82b, 84) comprises:

a frame (12);

end covers (80a, 80b) provided at both ends of said frame (12);

side covers (82a, 82b) provided at side surface sections of said frame (12); and a top cover (84) provided at an upper surface section of said frame (12), wherein:

said opening (88a, 88b) is formed at a gap between said top cover (84) and said side cover (82a, 82b).

* * * * *